United States Patent [19]

Jorgensen et al.

[11] 3,795,330
[45] Mar. 5, 1974

[54] COUNTERWEIGHT SUSPENSION DEVICE
[75] Inventors: Stanley A. Jorgensen, Oswego; Richard W. Moss, Jr., Aurora, both of Ill.
[73] Assignee: Caterpillar Tractor Co., Peoria, Ill.
[22] Filed: May 18, 1972
[21] Appl. No.: 254,496

[52] U.S. Cl.................... 214/142, 212/49, 214/138
[51] Int. Cl............................................... E02f 3/00
[58] Field of Search...... 214/127, 142, 138; 212/48, 212/49

[56] References Cited
UNITED STATES PATENTS

| | | | |
|---|---|---|---|
| 3,533,524 | 10/1970 | Wilcox | 214/142 |
| 911,632 | 2/1909 | Van Wie | 212/48 |
| 2,325,089 | 7/1943 | Zeilman | 212/49 |
| 2,925,149 | 2/1960 | Hughson | 212/49 X |
| 3,419,156 | 12/1968 | Mork | 212/49 |

Primary Examiner—Frank E. Weaver
Attorney, Agent, or Firm—Fryer, Tjensvold, Phillips & Lempio

[57] ABSTRACT

There is disclosed a counterweight suspension device for temporarily supporting a counterweight during its installation or removal from a counter-balanced vehicle. The suspension device includes a pair of flexible members connected to adjustable support means secured to the vehicle for elevationally positioning the counterweight relative to securing means on the vehicle. The support device eliminates external lift means and the requirement to accurately locate the counterweight with respect to the vehicle for mounting and is operative to free the counterweight for easier, more convenient removal from the vehicle.

8 Claims, 9 Drawing Figures

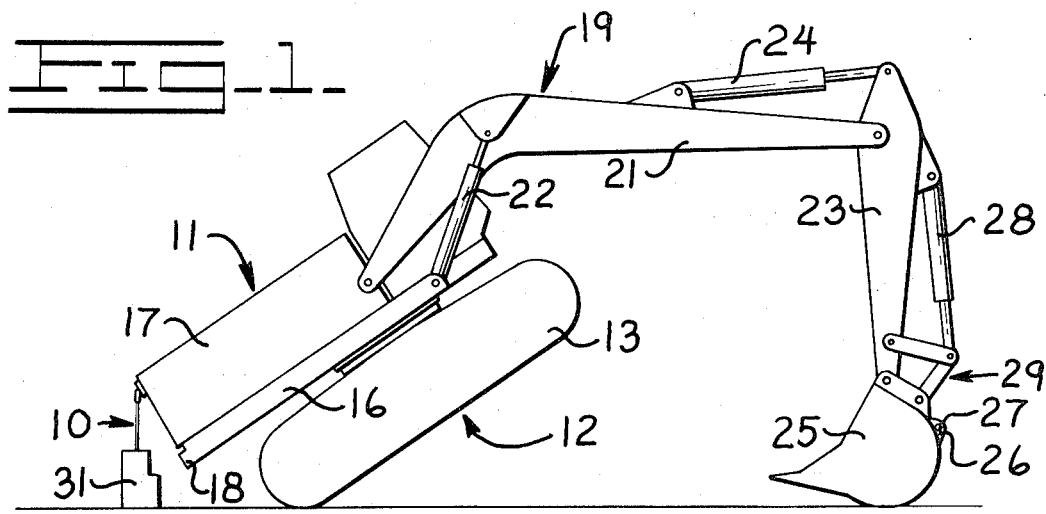
FIG_1_
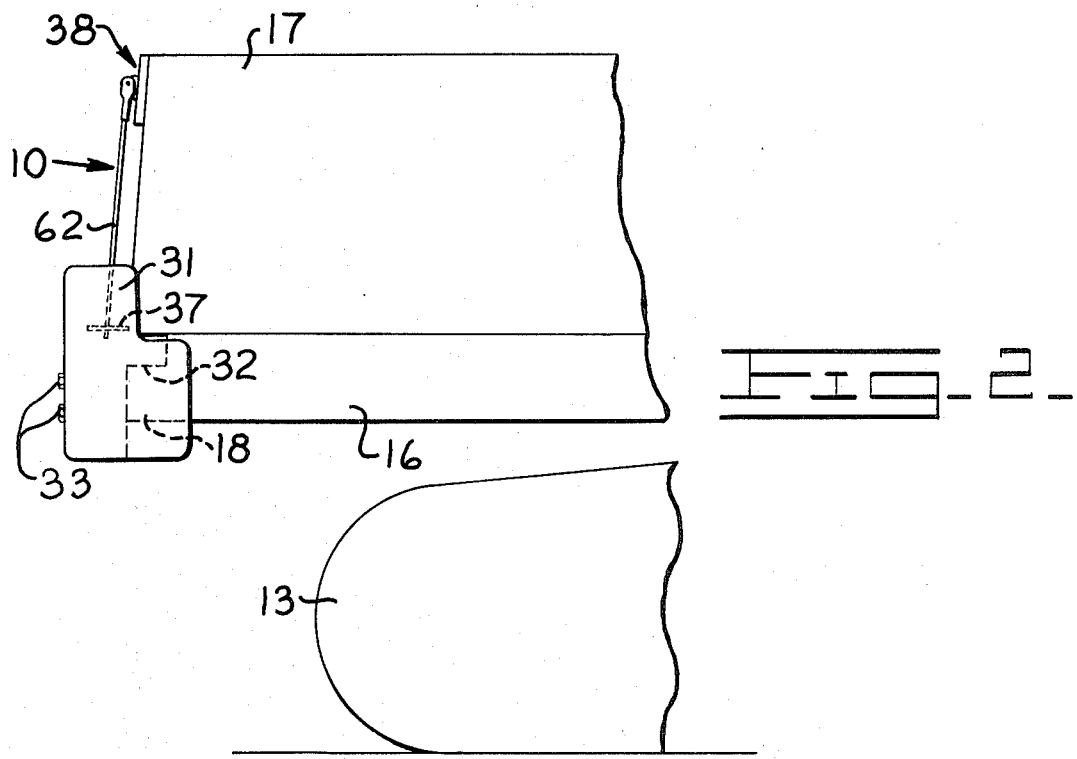
FIG_2_
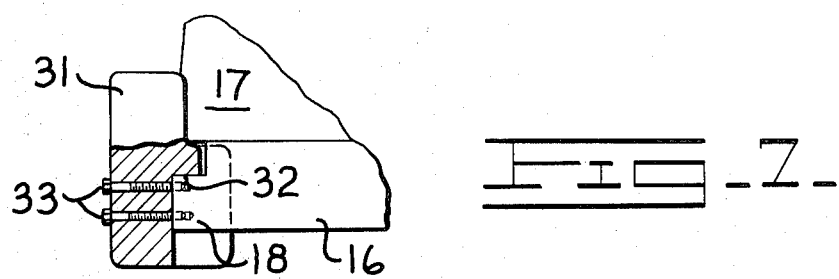
FIG_7_

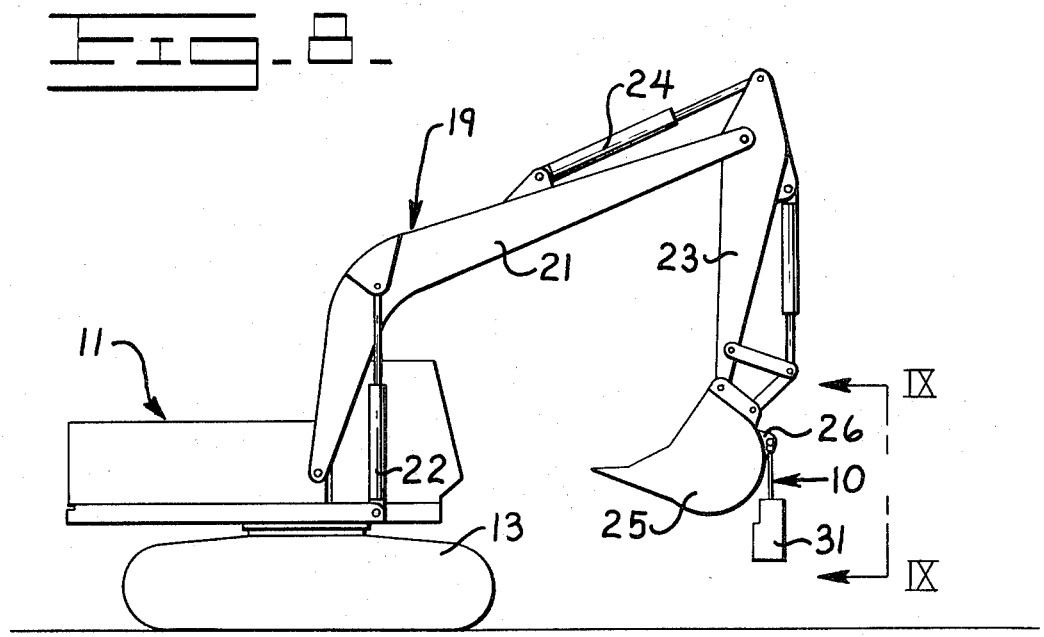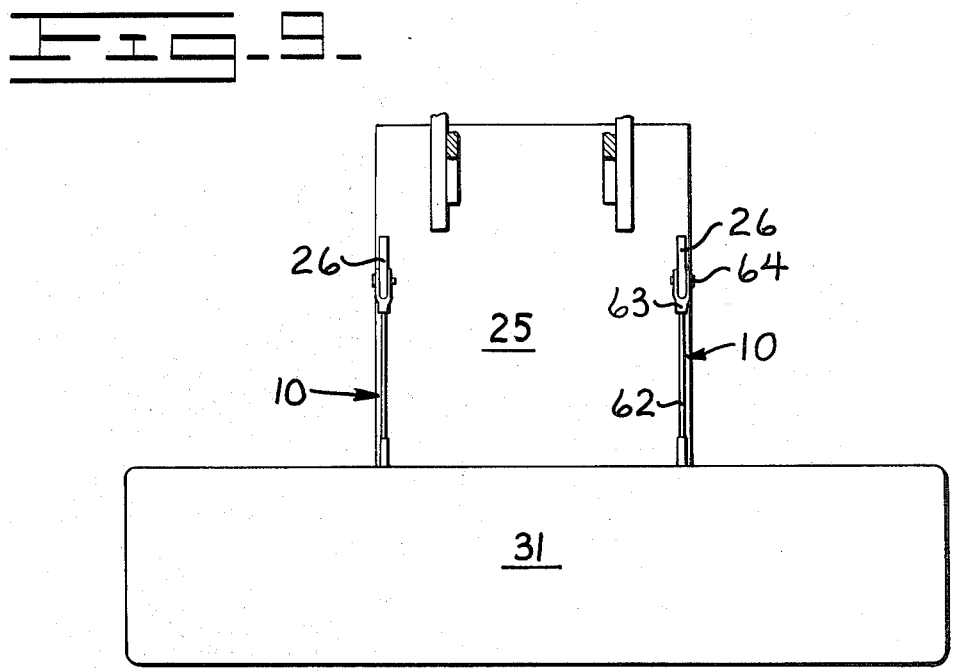

3,795,330

COUNTERWEIGHT SUSPENSION DEVICE

BACKGROUND OF THE INVENTION

Construction and earthmoving vehicles, such as hydraulic excavators, loaders, and the like, frequently have a counterweight attached to the rear thereof to counter-balance the weight of the bucket or implement mounted on its front end, to enable the vehicle to lift heavier loads and to increase its stability during operation. The weight of the counterweight varies from a few hundred pounds on small vehicles to several tons on larger vehicles, and adds significantly to the total weight of the vehicle. When the vehicle is to be transported from one job site to another, it is usually desirable to remove the counterweight from the vehicle to permit the weight to be more evenly distributed on the transport vehicle, and in many cases the counterweight must be transported on a separate transport vehicle to satisfy the State regulations on gross vehicle loads.

Various devices and procedures for mounting and removing counterweights can be found in the prior art. However, such devices have not proven satisfactory, in that they usually involve undue cost, complexity, and inefficiency of operation. In some cases, particularly in the field, the counterweight is placed on one or more support blocks adjacent to the vehicle at the approximate desired elevation to permit its mounting on or removal from the vehicle with a minimum of manual manipulation.

However, variations in the ground surface often necessitate the placement of shims beneath the counterweight to support it in proper alignment with the vehicle during mounting and removal of the counterweight. The heavier counterweights are commonly supported by a separate crane, lift truck, or other lifting mechanism during mounting and removal operations. However, that procedure depends upon such additional lifting mechanism being available at the job sites which are sometimes widely spaced, and thus adds to the vehicle operating expense.

Other mounting and removal arrangements as represented by U.S. Pat. No. 3,533,524, are attached directly to the vehicle. This type of arrangement does eliminate external and special lifting motors and linkages, but does not provide sufficient latitude in positioning the counterweight with respect to the vehicle, making its mounting and removal more difficult. Such arrangements also utilize rigid components pivotally connected to the vehicle such that they can swing only in a predetermined arc therefrom. Those arrangements require the vehicle to be aligned in precise registry with the counterweight to enable the components to be successfully assembled.

SUMMARY OF THE INVENTION

Accordingly, it is an object of this invention to provide an improved counterweight suspension device for mounting a counterweight on and removing it from a counterbalanced vehicle without requiring the utilization of additional lift mechanisms.

Another object of this invention is to provide an improved counterweight suspension device which permits the counterweight removed from the vehicle to be placed directly on the ground surface.

Another object of this invention is to provide an improved counterweight suspension device which permits the implement support linkage to be utilized for moving or handling the counterweight after its removal from the vehicle.

In accordance with a primary aspect of this invention, there is provided an improved counterweight suspension device which enables a counterweight to be transferred between the ground surface and the vehicle and positioned relative to the vehicle with greater precision than is obtainable with conventional mounting procedures.

The invention comprises a pair of flexible suspension members connected to a pair of adjustable brackets on the back of the vehicle for supporting and accurately elevationally positioning the counterweight relative to the vehicle for ease of attachment and to free its weight for easier detachment from the vehicle.

Other objects and advantages of the present invention will become more readily apparent upon reference to the accompanying drawings and following description.

BRIEF DESCRIPTION OF THE DRAWINGS

FIG. 1 is a side elevational view of a hydraulic excavator employing a counterweight suspension device embodying the present invention;

FIG. 2 is an enlarged view of a portion of the hydraulic excavator with the counterweight suspension device supporting the counterweight in attaching position;

FIG. 7 is a partial vertical sectional view through the counterweight taken on a line VII—VII of FIG. 3;

FIG. 8 is a side elevational view of the counterweight suspension device attached to a bucket of an implement support linkage of the hydraulic excavator; and, FIG. 9 is a front elevational view of the bucket, counterweight and counterweight suspension device of FIG. 8.

DESCRIPTION OF THE PREFERRED EMBODIMENT

Figure 3:
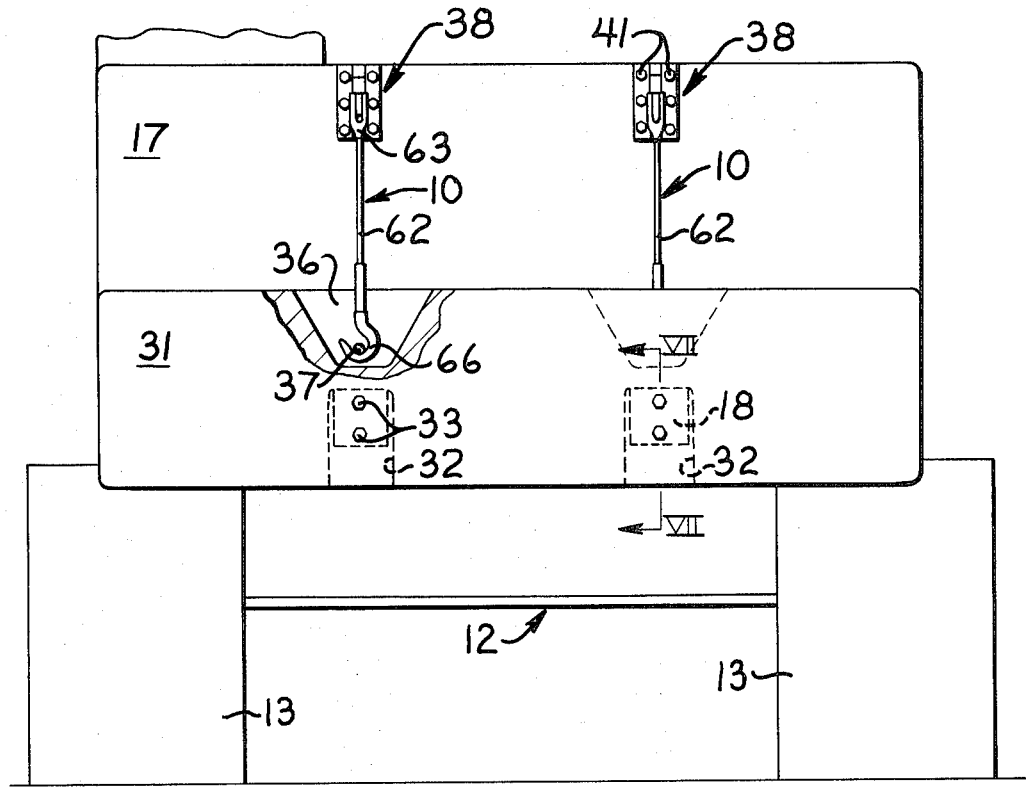
FIG. 3 is a rear elevational view of the excavator and the counterweight suspension device with portions broken away for illustrative convenience.

Referring more particularly to the drawings, a counterweight suspension device embodying the principles of the present invention is generally indicated by the reference numeral 10, in association with a vehicle such as a hydraulic excavator 11. The vehicle includes an undercarriage 12, having a pair of ground engaging track assemblies 13. An upper support frame 16 is suitably mounted on the undercarriage in a conventional manner and includes a reinforced machinery enclosure 17. A pair of frame extensions 18 project rearwardly from the support frame. An implement support linkage 19 is mounted on the forward end of the vehicle and has a boom 21 pivoted to the frame with a pair of hydraulic hoise jacks, one of which is shown at 22, extending between the support frame and the boom. The linkage includes a stick 23 pivoted to the distal end of the boom and moveable by a hydraulic jack 24 provided to the boom and connected to the stick. A bucket 25 is pivoted to the end of the stick, and a hydraulic wrist jack 28 is pivoted to the stick and connected to the bucket through a wrist linkage 29. As best shown in FIGS. 1, 8 and 9, the bucket has a pair of spaced projections 26, each of which has a bore 27 extending therethrough. The hydraulic jacks are double-acting and are controlled by pressurized hydraulic fluid from a control system on the excavator in the usual manner. By placing the bucket on the ground surface as shown in FIG. 1, and retracting the hydraulic jack 22, the front of the vehicle can be elevated to the position shown in FIG. 1.

As best shown in FIGS. 2, 3 and 7, the excavator is provided with a counterweight 31 which is mounted transversely at the rear of the vehicle. The counterweight is operative to counter-balance loads carried in the bucket, to thereby increase the stability of the vehicle and the load carrying capacity thereof. Suitable securing means comprises a pair of spaced recesses 32 having tapered sides, provided in the forward side of the counterweight to receive the frame extensions 18. The counterweight is supported by the frame extensions and is secured to the upper support frame 16 by a plurality of bolts 33. A pair of cavities 36 are formed in the top surface of the counter weight intermediate its ends. A pair of bars 37, secured within the counterweight, are arranged individually to span the cavities.

Figures 4, 5, 6:
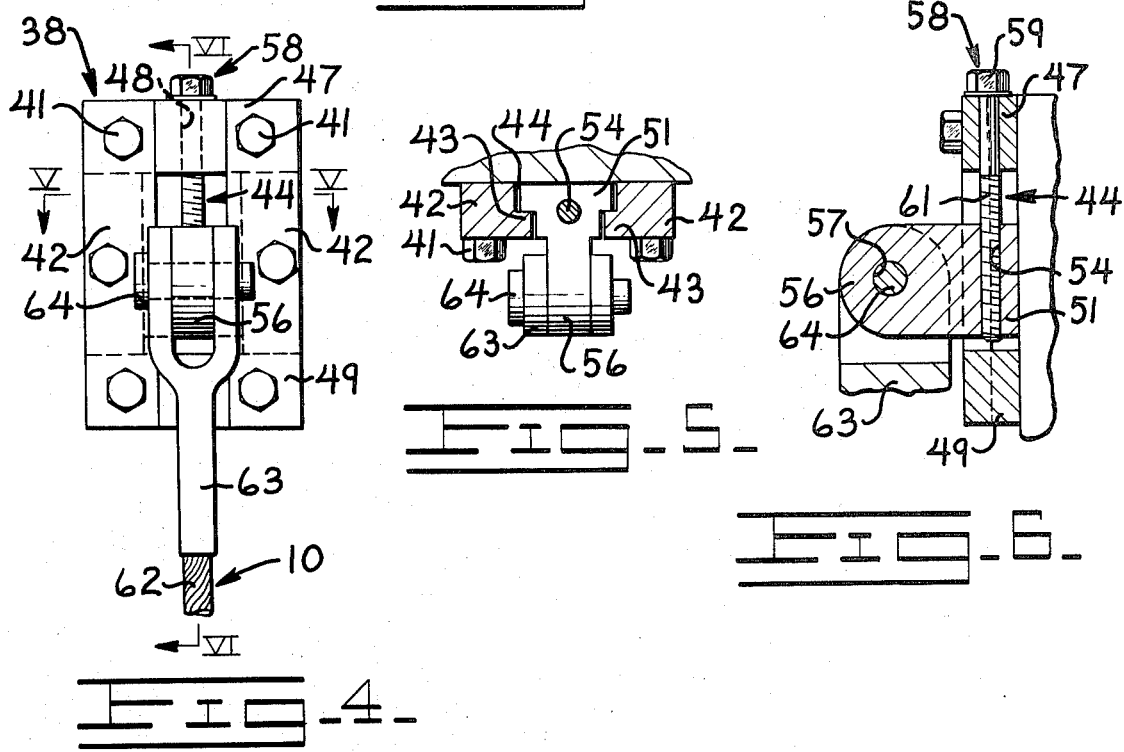
FIG. 4 is an elevational view of an upper support of the counterweight suspension device enlarged from that shown in FIG. 3.
FIG. 5 is a transverse horizontal sectional view through the upper support taken on a line V—V of FIG. 4.
FIG. 6 is a partial longitudinal vertical sectional view through the upper support taken on line VI—VI of FIG. 4.

The counterweight suspension device or assembly includes a pair of upper hanger blocks or adjustable brackets 38 which are attached at the rear of the machinery enclosure 17 of the upepr support frame 16, and above and slightly forward of the center of gravity of the counterweight 31. As best shown in FIGS. 4, 5 and 6, each of the upper brackets 38 is secured to the rear of the machinery enclosure 17 by a plurality of bolts 41. The brackets individually include a base member comprising a pair of spaced substantially parallel vertically disposed L-shaped guide members 42. Each of the guide members has a projection 43 which extends toward the opposite member and is spaced outwardly from the machinery housing to form a T-shaped slot 44 therebetween. An upper anchor bar 47 is rigidly secured to the upper ends of the guide members and has a bore 48 extending therethrough in alignment with the T-shaped slot. A lower stop bar 49 is ridigly secured to the lower ends of the guide members.

A T-shaped slide block 51 is slidably disposed within the slot 44 of each of the hanger blocks 38. A threaded bore 54 is provided through the slide block in substantial alignment with the bore 48 of the anchor bar 47. Each slide block further includes a lug 56 extending outwardly from its base. The lug is provided with a bore 57 extending therethrough, substantially perpendicular to the threaded bore 54. A cap screw 58 extends through the bore 48 and has an enlarged head 59 supported upon the anchor bar and a threaded portion 61 threadably engaging the threaded bore 54 to form a screw and nut adjusting means.

The counterweight suspension device further includes a pair of elongated suspension members such as flexible cables 62, which individually extend between the adjustable brackets 38 and the counterweight 31. Each of the elongated flexible cables has a clevis 63 secured to the upper end thereof, with the clevis being pivotally secured to the lug 56 of its respective bracket by a pin 64. A hook 66 is secured to the lower end of each flexible cable and is adapted to be releasably engaged with the bar 37 of the counterweight 31.

OPERATION

During operation of the hydraulic excavator 11, the elongated suspension members 62 are maintained in a relaxed condition with the total weight of the counterweight 31 being supported by the frame extension 18 of the support frame 16. When the counterweight is to be removed, the adjustment screws 58 of each upper support bracket 38 are rotated in a first direction, causing the slide blocks 51 to move upward until the suspension members are taut. The bolts 33 securing the counterweight to the support frame are then removed and the screws 58 rotated further, causing the suspension members to elevate the counterweight slightly to free it from the frame extensions.

The next phase of the counterweight removal is to elevate the front of the vehicle or excavator. This is achieved by manipulating the stick 23 to a substantially vertical position, placing the bucket 25 on the ground surface, and retracting the jacks 22. As the front of the excavator raises, the rear end pivots about the rear of the track assemblies 13 and the counterweight is supported in dual pendulum fashion from the upper supports 38 until the counterweight is placed on the ground. At this point, the suspension members 62 become slack and the pins 64 at the upper ends thereof are manually disengaged from the slide blocks 51 of the upper hanger blocks 38 and the excavator is lowered to its level position by extending the hydraulic jacks 22. An alternate procedure is to manually disengage the hooks 66 at the lower ends of the suspension members from the bars 37 of the counterweight when the suspension members become slack.

If further handling of the counterweight 31 is desired, such as loading it onto a transport vehicle, the excavator is repositioned with the bucket 25 slightly above the counterweight. The clevis 63 of the suspension members 62 is then manually attached to the projections 26 on the bucket by inserting the pins 64 through the clevis and the bores 27 of the projections. The counterweight is then raised and moved by normal operation of the support linkage 19 and excavator 11.

The procedure for mounting the counterweight to the rear of the excavator is essentially the reverse of the removal procedure, and is initiated by positioning the rear end of the excavator slightly forward of the counterweight which is sitting on the ground. The front end of the excavator is then elevated as described in the removal procedure and the hooks of the suspension members 62 are manually attached to the bars 37 of the counterweight and the front of the vehicle again is lowered. The flexible suspension member 62 permits the hooks 66 to engage bars 37 on the counterweight, even when it is sitting on uneven terrain. That is, so long as the cable will reach the farthest bar 37, the counterweight can be secured. As the front end is being lowered, the counterweight is raised from the ground and temporarily supported by the counterweight suspension device. The counterweight is supported in dual pendulum fashion by the upper supports during this phase of the mounting procedure. Proper alignment between the recesses 32 of the counterweight and the frame extensions 18 of the upper support frame 16 is permitted due to the flexibility of the suspension members 62. The tapered sides of the recesses 32 insure proper alignment as engagement occurs.

With the front of the vehicle lowered to the ground surface, the upper supports are slightly forward of the center of gravity of the counterweight, causing it to swing forwardly, assuring that the counterweight abuts the upper support frame and no manual manipulation of the counterweight is required. The slide blocks 51 of the upper supports are lowered by counter rotation of the capscrews until the counterweight is supported by the frame extension. The counterweight is then secured to the upper support frame 16 by bolts 33, and the slide blocks are further lowered sufficiently to relieve the tension in the suspension members 62.

In view of the foregoing, it is readily apparent that the structure of the present invention provides an improved counterweight suspension device which permits a counterweight to be removed from the excavator and lowered to the ground surface without the aid of an additional lift mechanism. Likewise, when mounting the counterweight, the device permits the counterweight to be elevated from the ground surface and assures proper alignment between the vehicle and counterweight. The counterweight suspension device is used only for the purpose of temporarily supporting the counterweight during removal and mounting procedures and does not support the counterweight during normal operation of the vehicle, thereby relieving the stresses in the temporary supporting structure. The counterweight is normally totally supported by a frame extension and the counterweight removal and mounting arrangement is provided with a moveable element adapted for elevational adjustment to free the counterweight from the frame during removal of the counterweight.

While the invention has been described with particular reference to the preferred embodiment, it is apparent that variations are possible within the scope of the present invention, as defined in the following claims.

What is claimed is:

1. A counterweight suspension device in combination with a counter-balanced vehicle comprising a frame having opposite ends with counterweight securing means at one end, and implement support linkage at the other end of the frame capable of tilting said vehicle to lower said one end of the frame relative to said other end;
    adjustable bracket means attached to said frame above said securing means;
    an elongated flexible cable member having opposite predetermined upper and lower ends pivotally connected respectively to said bracket and said counterweight, and having a hook at the lower end thereof, and said counterweight includes a cavity and a bar spanning said cavity to receive said hook, said elongated cable member being operative to support the counterweight in pendulum fashion to swing toward and away from the frame when said vehicle is tilted to facilitate the securing and removal of said counterweight relative to said securing means.

2. The invention of claim wherein said securing means comprises a pair of spaced recesses formed in said counterweight and a pair of frame members engaging said recesses so that said counterweight rests on said frame members in the secured position.

3. The invention of claim 2 wherein said bracket means is adjustable and comprises a slide block slidably received between a pair of guide blocks and a screw and nut assembly operatively connected to move said slide block with respect to said guide blocks.

4. The counterweight suspension device of claim 3 wherein said slide block includes a lug having a bore extending therethrough, and said cable is attached thereto by means of a pin and a clevis.

5. The counterweight suspension device of claim 4 wherein a work member is connected to said implement support linkage, said work member including a pair of projections, each of which has a bore extending therethrough to permit said clevis of said flexible member to be releasably attached thereto, whereby said implement support linkage is employed to reposition said counterweight after its removal from said vehicle.

6. A counterweight suspension assembly for a counterbalanced vehicle having a frame with opposite ends and having counterweight securing means at one end, and implement support linkage at the other end of the frame capable of tilting said vehicle to lower said one end of the frame relative to said other end, said counterweight suspension device comprising:
    bracket means for attachment to a vehicle frame above counterweight securing means on said frame; comprising a pair of laterally spaced adjustable brackets, each of which includes a moveable element and an anchor having a bore therethrough, and adjustment means extended through said bore and engagable with said moveable element to adjust the elevational position thereof with respect to said securing means; and,
    elongated flexible means comprising a pair of cables having opposite predetermined upper and lower ends pivotally connected respectively to said bracket and a counterweight;
    said elongated flexible means being operative to support said counterweight in pendulum fashion to swing toward and away from the securing means when said vehicle frame is tilted to facilitate the securing and removal of said counterweight relative to said securing means.

7. The counterweight suspension assembly of claim 6 wherein said moveable element has a threaded bore formed therein, and said adjustment means is a screw having a threaded body which extends through said bore in said anchor and threadably engages said threaded bore in said moveable element, and said screw having an enlarged head portion supported upon said anchor; and,
    each of said cables including a hook at the lower end thereof to engage a bar connected to said counterweight.

8. The counterweight suspension device of claim 7 wherein said bracket means includes a pair of vertically disposed substantially parallel L-shaped guide members forming a T-shaped slot, and said moveable element comprises a T-shaped block slidably disposed in said slot of the guide means.

* * * * *